(12) United States Patent
Tsyrganovich

(10) Patent No.: US 9,337,744 B1
(45) Date of Patent: May 10, 2016

(54) EFFICIENT INRUSH CURRENT CONTROL IN POWER FACTOR CORRECTED AC-TO-DC CONVERTER

(71) Applicant: IXYS Corporation, Milpitas, CA (US)

(72) Inventor: Anatoliy V. Tsyrganovich, Woodside, CA (US)

(73) Assignee: IXYS Corporation, Milpitas, CA (US)

( * ) Notice: Subject to any disclaimer, the term of this patent is extended or adjusted under 35 U.S.C. 154(b) by 0 days.

(21) Appl. No.: 14/700,477

(22) Filed: Apr. 30, 2015

(51) Int. Cl.
*H02M 7/06* (2006.01)
*H02M 1/42* (2007.01)

(52) U.S. Cl.
CPC .............. *H02M 7/06* (2013.01); *H02M 1/4208* (2013.01)

(58) Field of Classification Search
CPC ........ H02M 1/4208; H02M 7/00; H02M 7/06
USPC ........................................................ 363/126
See application file for complete search history.

(56) References Cited

U.S. PATENT DOCUMENTS

| 5,483,142 A | * | 1/1996 | Skibinski | ............... | H02H 9/001 |
| | | | | | 320/166 |
| 6,353,545 B1 | * | 3/2002 | Ueda | ....................... | H02M 1/36 |
| | | | | | 323/908 |

OTHER PUBLICATIONS

Marcus Amilcar, et al., "Inrush Transient Current Mitigation—A Major Qualifying Project", Worcester Polytechnic Institute, 53 pages (Apr. 26, 2012).

* cited by examiner

*Primary Examiner* — Adolf Berhane
*Assistant Examiner* — Afework Demisse
(74) *Attorney, Agent, or Firm* — Imperium Patent Works; T. Lester Wallace

(57) ABSTRACT

An AC-to-DC converter involves a rectifier, an inductor, a storage capacitor, a switch, and a microcontroller. In a capacitor pre-charge operation, the periodicity and voltage amplitude of an AC supply voltage are determined. Based on this, the microcontroller identifies one of a plurality of stored sequences. Each sequence is a list of values. The microcontroller turns off the switch on AC supply voltage zero crossings and turns on the switch in accordance with the values. As a result, a sequence of identical pulses of charging current flows into the storage capacitor. Each pulse passes in a current path from the rectifier, through the inductor, through the capacitor, through the switch, and back to the rectifier. During the pre-charge operation, the microcontroller does not measure the capacitor voltage and use that to calculate when to the turn the switch on next, but rather the sequence of precalculated stored values is used.

23 Claims, 4 Drawing Sheets

PFC-CONTROLLED AC-TO-DC CONVERTER

PFC-CONTROLLED AC-TO-DC CONVERTER

US 9,337,744 B1

EFFICIENT INRUSH CURRENT CONTROL IN POWER FACTOR CORRECTED AC-TO-DC CONVERTER

TECHNICAL FIELD

The described embodiments relate generally to inrush current control and to pre-charging of storage capacitors in power supplies, particularly AC-to-DC converters, and to related structures and methods.

BACKGROUND INFORMATION

Power supplies such as AC-to-DC (Alternating Current to Direct Current) converters often have large storage capacitors. When the power supply is initially plugged in, or is powered up, a large inrush current may flow into the power supply while the storage capacitor is charging from ground potential up to the voltage it normally has during steady state operation of the power supply. Such large inrush currents are undesirable for many reasons. Large inrush currents may cause unwanted strain on components and may shorten the lifetime of certain components of the power supply. Such a large inrush current may cause a circuit breaker to trip. Such a large inrush current may cause unwanted EMI/EMC (electromagnetic interference/electromagnetic compatibility) noise issues on the power cabling through which current is supplied to the power supply. There are multiple different techniques and circuits that have been employed to reduce and control such inrush currents. Many schemes involve the use of an NTC (Negative Temperature Coefficient) component in the inrush current path to limit inrush current. When the power supply initially powers up, the NTC component is not hot, so its resistance is higher. The higher resistance limits the magnitude of the inrush current. Subsequently, after the storage capacitor has charged and after a period of current flow through the NTC component, the NTC component has heated up and its resistance has decreased. The reduced resistance reduces the current limiting effect of the circuit and therefore reduces power loss in the NTC component during subsequent operation of the power supply. The NTC component, however, still has some resistance. The presence of the NTC component in the current path decreases efficiency of the power supply. In other inrush current control techniques, a power component such as a relay is used to short current around the NTC component during steady state power supply operation. A relay, however, is an expensive and unreliable component. Moreover, in high-power power supplies, and in power supplies that are powered up frequently, repeated switching of a relay may cause the contacts of the relay to degrade such that the resistance of the relay increases somewhat. If all the current flowing to the power supply flows through the relay, this slight increase in relay resistance may be significant. Some of these drawbacks may be eliminated by use of a time-delayed switching technique. In the time-delayed switching technique, one or more power switches are provided to break a current path to the storage capacitor. The switch or switches turn on and off to allow only a small amount of charging current to flow into the storage capacitor each cycle of the AC supply voltage. The storage capacitor is charged over multiple cycle of the AC supply voltage. U.S. Pat. No. 5,483,142 sets forth one such circuit. Power devices are not the only expensive components in a cost sensitive power supply. If a powerful microcontroller is required, the power microcontroller and its peripheral and support chips also adds to overall power supply cost. In cost sensitive power supplies, a microcontroller that is fast enough and powerful enough to perform the methods set forth in U.S. Pat. No. 5,483,142 is undesirably expensive. Another time-delayed switching inrush current control circuit is set forth in "Inrush Transient Current Mitigation—A Major Qualifying Project", Worchester Polytechnic Institute, by Marcus Amilcar et al., Apr. 26, 2012. This technique, however, involves an SCR thyristor as well as multiple TRIACs. Current flowing into the full bridge rectifier of the power supply is switched by these multiple components in a rigid fashion to allow a charging current to flow in a limited way each cycle. In addition, providing the multiple power devices of the circuit is undesirably expensive. Accordingly, all of these inrush current control circuits have drawbacks.

SUMMARY

A Power Factor Corrected AC-to-DC converter involves a bridge rectifier, an inductor, a storage capacitor, a switch, and a microcontroller. The AC-to-DC converter receives an AC supply voltage across two input terminals and outputs a DC output supply voltage across two output terminals. In a novel capacitor pre-charge operation, the storage capacitor is charged from an initial storage capacitor voltage up to a final pre-charge storage capacitor voltage. In one example the initial storage capacitor voltage is approximately zero volts and the final pre-charge storage capacitor voltage is the peak voltage of the AC supply voltage. Initially, the microcontroller determines the periodicity of the AC supply voltage and also determines the voltage magnitude of the AC supply voltage. In one example, the periodicity is 60 hertz and the voltage magnitude of the AC supply voltage is +157 volts (the peak voltage of the AC supply voltage). There are multiple sequences of values. In one example, the multiple sequences of values are stored in the microcontroller. Some sequences may have more values than other sequences. Depending on the particular embodiment, the values may either be switch turn on time values, or may be values that are adjusted or scaled by the microcontroller to obtain switch turn on time values. The microcontroller identifies the one sequence that is appropriate and that corresponds to the particular determined periodicity and the particular determined voltage magnitude. After the sequence has been identified, the microcontroller waits for a zero crossing time of the AC supply voltage. Starting at the zero crossing time, the microcontroller uses the first switch turn on time value to time a delay time until the switch is turned on a first time. The turning on of the switch causes one and only one pulse of current to flow in a current path and into the storage capacitor. The current path extends from a first terminal of the bridge rectifier, through the inductor, through the storage capacitor, through the switch, and to a second GND terminals of the bridge rectifier. How large the peak current of the pulse is depends on how early before the next zero crossing the switch is turned on and on what the voltage on the storage capacitor is when the switch is turned on. After the first pulse of charging current has pulsed into the storage capacitor, the microcontroller controls the switch to turn off on the next zero crossing of the AC supply voltage. The next switch turn on time value of the identified sequence is then used by the microcontroller to time a delay time from the zero crossing until the switch is to be turned on a second time. The delay time is such that when the switch is turned on the second time, the peak current magnitude of the second pulse of charging current is the same as the peak current magnitude of the first pulse. After the second pulse of charging current has pulsed into the storage capacitor, the switch is turned off on the next zero crossing of the AC supply voltage. The third switch on time value in the identified sequence is then used by the microcontroller in the same way to control when the switch turns on a third time to generate the third pulse of charging current, and so forth. This process repeats for each of the switch on time values of the sequence. The switch turn on times are such that the resulting peak current magnitudes of all of the pulses of charging current are all identical. Each pulse of charging current causes the voltage on the storage capacitor to step up an equal voltage amount. At the end of the sequence, the voltage on the storage capacitor has stepped so many times that the voltage on the storage capacitor is at or approximately at the final pre-charge storage capacitor voltage. In the time period between the time of the first pulse of charging current and the time of the last pulse of charging current, the microcontroller does not measure the voltage on the storage capacitor and use information from that measurement to calculate when to turn on the switch the next time. After the last switch turn on time value has been used to turn on the switch and to cause the last pulse of charging current to flow into the storage capacitor, the capacitor pre-charge operation is completed and the microcontroller begins operating in a PFC (Power Factor Correction) mode. In the PFC mode, the same microcontroller does measure the storage capacitor voltage and uses information from that measurement to regulate the AC-to-DC converter output voltage. In the PFC mode, the microcontroller pulse width modulates the ON/OFF time of a second switch and thereby controls the phase of the envelope of the current flowing through the inductor so that the phase of the inductor current matches the phase of the AC supply voltage.

Further details and embodiments and methods and advantageous variations on the above-described AC-to-DC converter are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
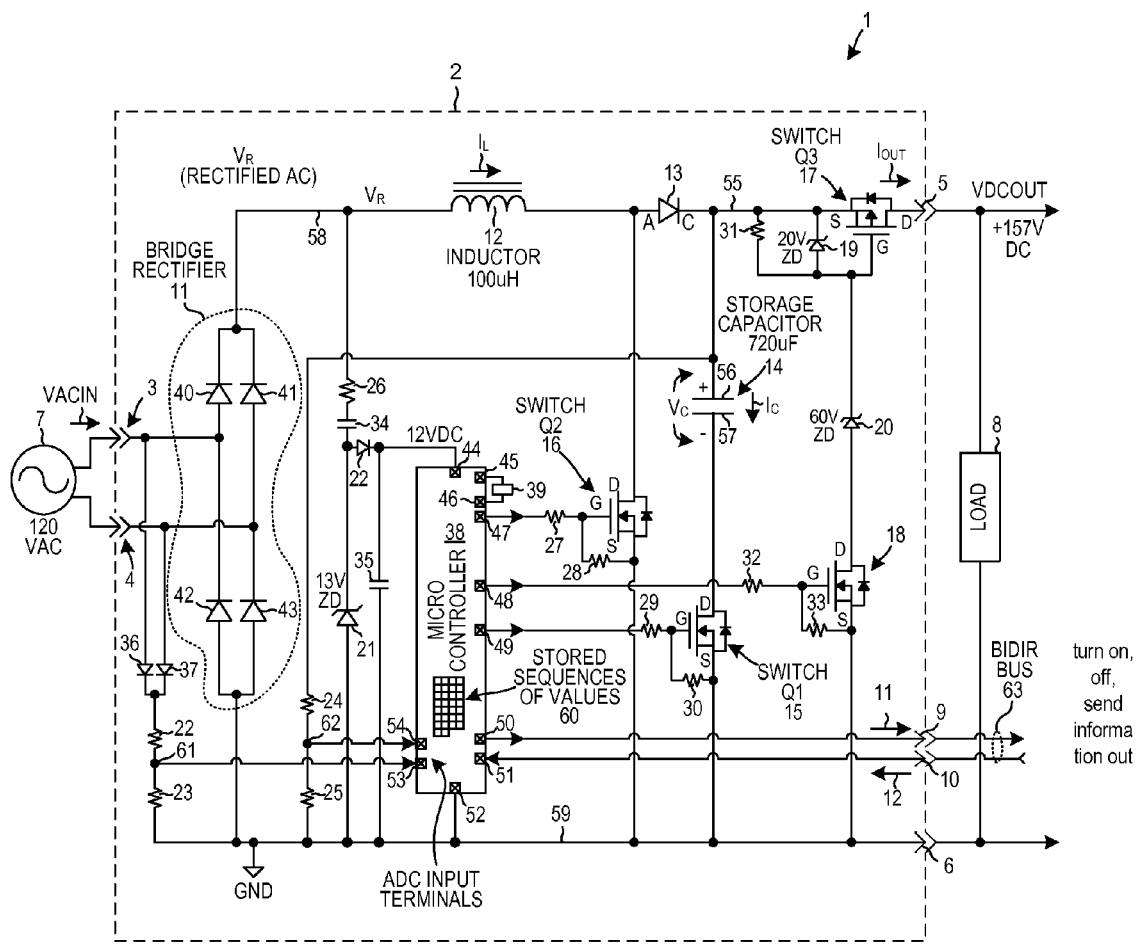
FIG. 1 is a circuit diagram of a Power Factor Corrected AC-to-DC converter circuit that employs a novel and efficient inrush current control method and circuitry in accordance with one novel aspect.

FIG. 1 is a diagram of a system 1 involving a Power Factor Corrected AC-to-DC converter circuit 2 in accordance with one novel aspect. AC-to-DC converter circuit 2 has two input terminals 3 and 4. It is through these terminals 3 and 4 that the AC-to-DC converter circuit 2 receives a sinusoidal AC supply voltage VACIN. In one example, VACIN is a 120 volts AC RMS 60 hertz supply voltage. In another example, VACIN is a 240 volts AC RMS 50 hertz supply voltage. The AC-to-DC converter circuit 2 is designed to be able to receive either AC supply voltage.

In addition, the AC-to-DC converter circuit 2 includes two output terminals 5 and 6. The AC-to-DC converter circuit 2 outputs a DC voltage VDOUT onto these output terminals. Terminal 5 is the VDCOUT terminal. Terminal 6 is the ground terminal. In the present example, an AC source 7 supplies a 120 volts AC supply voltage to the AC-to-DC converter circuit 2 via terminals 3 and 4 such that the AC-to-DC converter circuit 2 outputs a DC output voltage VDCOUT of approximately +157 volts DC via terminals 5 and 6 to a load 8. In addition to terminals 3-6, the AC-to-DC converter circuit 2 also has two serial bus terminals 9 and 10. Digital information 11 is communicated serially out of the AC-to-DC converter circuit 2 via terminal 9, and digital information 12 is communicated serially into the AC-to-DC converter circuit 2 via terminal 10. The bus 63 may, for example, be an I2C bus that operates in accordance with the Official I2C Bus Specification, Version 6, Document UM10204 (Apr. 4, 2014), available from NXP Semiconductors N.V. at www.nxp.com. Via bus 63, the microcontroller 38 receives commands including turn on commands and turn off commands. The microcontroller 38 also communicates information across this bus 63 and out of the AC-to-DC converter. This information may include information about the detected voltage amplitudes, current amplitudes, AC supply voltage periodicity, temperature information, current load information, fault conditions and information, and so forth.

The AC-to-DC converter circuit 2 further includes a full-wave bridge rectifier 11, an inductor 12, a diode 13, a storage capacitor 14, a first N-channel FET (Field Effect Transistor) switch Q1 15, a second N-channel FET switch Q2 16, a third P-channel FET switch Q3 17, a fourth N-channel FET switch 18, a 20 volt zener diode 19, a 60 volts zener diode 20, a 13 volt zener diode 21, resistors 22-33, capacitors 34 and 35, diodes 36 and 37, a microcontroller 38, and a crystal 39. The full-wave bridge rectifier is made up of four diodes 40-43. Components 26, 34, 22, 21, and 35 together form a 12 volt DC voltage supply circuit that supplies 12 volts DC to the microcontroller. The terminals of the microcontroller 38 are identified by reference numerals 44-54. Although the processor within the microcontroller package is powered by a voltage lower than 12 volts, the 12 volt DC supply voltage received onto the microcontroller via terminal 44 is used to power FET driver circuits. In the illustrated example, the FET driver circuits are disposed within the microcontroller integrated circuit package. The FET driver circuits drive N-channel FETs 15, 16 and 18.

P-channel FET switch Q3 17 is protection transistor. This switch Q3 17 can be turned off to protect the load from being damaged or otherwise being adversely affected by the AC-to-DC converter circuit 2, and/or to prevent circuitry outside the AC-to-DC converter circuit 2 from damaging or adversely affecting the AC-to-DC converter circuit 2 via terminal 5. N-channel transistor 18, resistors 32 and 33, and zener diodes 19 and 20, and resistor 31 are an interface circuit network for interfacing to and driving the protection switch Q3 17. To turn the P-channel switch Q3 17 on, the microcontroller 38 outputs a digital high signal from its output terminal 48, which in turn causes transistor 18 to turn on, and causes switch Q3 to be turned on. Conversely, to turn the P-channel switch Q3 17 off, the microcontroller 38 outputs a digital low signal from its output terminal 48, which in turn causes transistor 18 to turn off, and causes switch Q3 to be turned off. Zener diode 19 limits the gate-to-source voltage Vgs of the P-channel FET Q3 17 to 20 volts. Zener diode 20 limits the voltage swing on the gate of the P-channel FET Q3 17 to about 40 volts.

FIG. 1 sets forth a method 100 of operating the AC-to-DC converter circuit 2 in a novel "Capacitor Pre-Charge Mode". The 720 uF storage capacitor 14 is initially totally uncharged. The capacitor voltage $V_C$ is zero. As illustrated in FIG. 1, this voltage $V_C$ is the voltage across the storage capacitor 14, and is not necessarily the voltage on one node 55. The storage capacitor 14 has a first lead 56 and a second lead 57. Although the storage capacitor 14 is described here and is illustrated in FIG. 1 as being single component, it is understood that the storage capacitor 14 may involve one or more capacitor components coupled together.

The pre-charge operation is initiated (step 101). Examples of things that can cause the pre-charge operation to be initiated include the occurrence of a power up condition, detection by the AC-to-DC converter circuit of an external event, or receipt by the AC-to-DC converter circuit of a particular command across the serial bus. Once the pre-charge operation has been initiated, the microcontroller determines the periodicity (step 102) of the AC supply voltage. In the present example, the microcontroller does this by monitoring the AC supply voltage via diodes 36 and 37 and a resistive divider involving resistors 22 and 23. The voltage on the tap 61 of the resistive divider is received onto terminal 53 of the microcontroller and is digitized by an ADC (Analog-to-Digital Converter) with in the microcontroller. The voltage on tap 61 is a predetermined and known fraction of the voltage of the AC supply voltage. Accordingly, the microcontroller 38, through components 36, 37, 22 and 23, detects when the absolute value of the voltage of the AC supply voltage is below a predetermined low positive voltage (for example, 15 volts). As the absolute value of voltage of the AC supply voltage decreases in the time approaching a zero crossing time, the time when the absolute value of the AC supply voltage drops the predetermined low voltage (for example, 15 volts) is logged. Then after the zero crossing, the next time when the absolute value of the AC supply voltage rises above the predetermined low voltage (for example, 15 volts) is logged. The microcontroller calculates the time halfway between these two logged times. This calculated halfway time is the determined zero crossing time. The microcontroller does this detection for multiple zero-crossings of the AC supply voltage. The microcontroller uses the resulting determined zero-crossing times to determine the period (the "periodicity") of the AC supply voltage. The time between two consecutive such zero-crossings is the half period of the AC supply voltage. The microcontroller uses the detected zero-crossing times to determine whether the AC supply voltage has a 60 hertz frequency, or whether the AC supply voltage has a 50 hertz frequency, or whether the AC supply voltage has a 400 hertz frequency. In the present example, the determined periodicity is 60 hertz.

In addition, the microcontroller determines the voltage amplitude (step 103) of the AC supply voltage. The microcontroller uses components 36, 37, 22 and 23 and its ADC to sample and to digitize the voltage of the AC supply voltage. The highest digitized value is the peak voltage of the AC supply voltage. In the present example, this determined voltage amplitude is +157 volts.

The microcontroller stores a plurality of sequences 60. In the presently described example, each sequence of the plurality 60 is a sequence of precalculated switch turn on time values. One of the sequences is a sequence for the determined periodicity (60 hertz in this example) and the determined peak amplitude (+157 volts in this example). The microcontroller identifies this sequence (step 104) based on the determined periodicity and the determined peak voltage. In the present example, the identified sequence is a set of seven switch turn on time values. Each value is a value that can be loaded into a timer in the microcontroller so that the timer will time a delay from the occurrence of a zero crossing until the first switch Q1 15 is turned on. At a zero-crossing, the microcontroller controls the first switch Q1 15 to be off. The timer is loaded with the next switch turn on time value of the identified sequence, and the timer is started at the zero crossing time. When the timer expires, the microcontroller outputs a digital logic high signal on terminal 49 to turn the first switch Q1 15 on. The first switch Q1 15 remains on until the next zero-crossing time, at which time the microcontroller outputs a digital logic low signal on terminal 49 thereby turning the first switch Q1 15 off.

Figure 2:
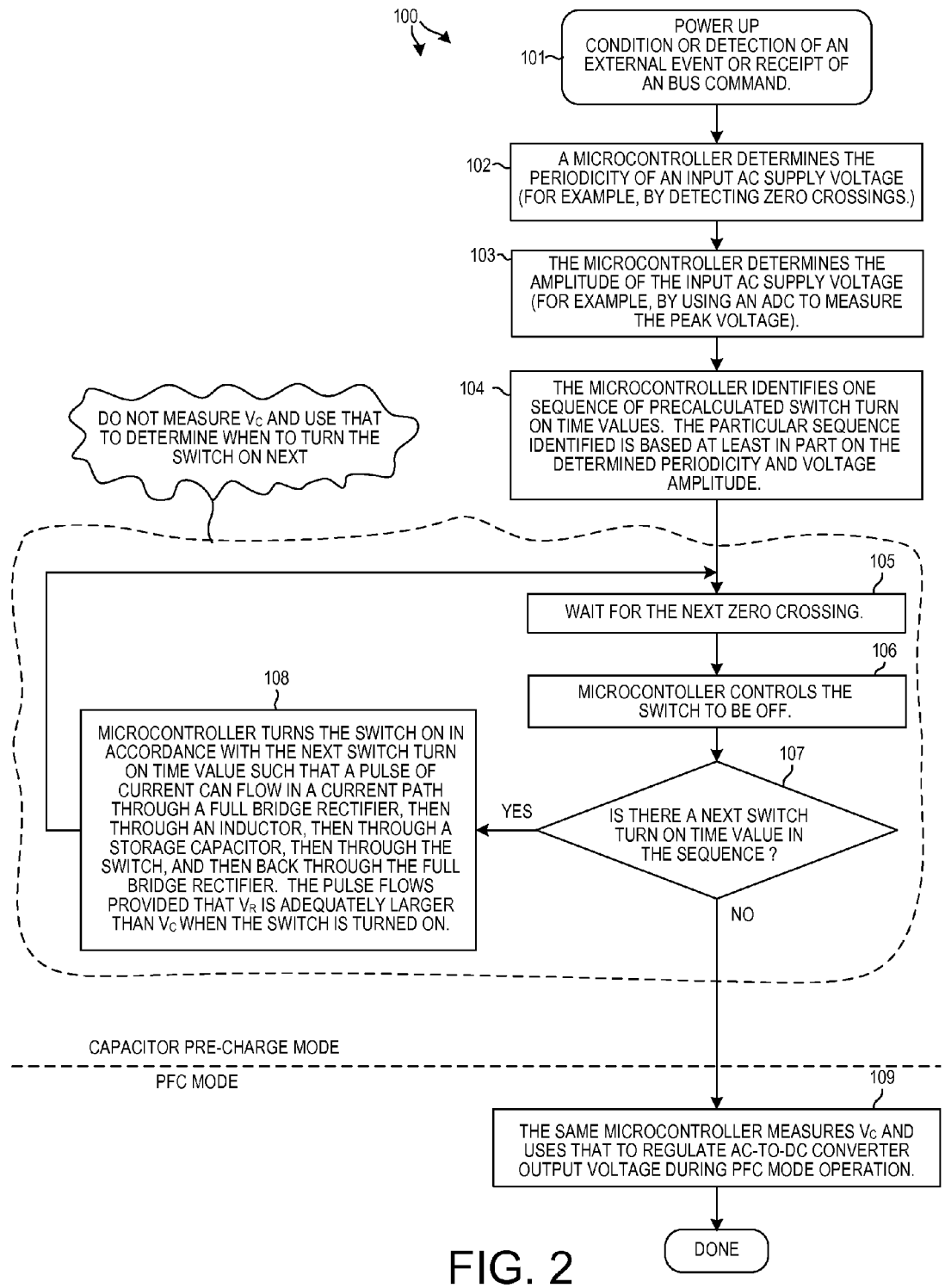
FIG. 2 is a flowchart of a capacitor pre-charge operation in accordance with one novel aspect.

In the flowchart of FIG. 2, after the proper sequence has been identified (step 104), the microcontroller waits (step 105) for the next zero-crossing. At the time of the zero-crossing, the microcontroller controls the first switch Q1 15 to be off by outputting a digital low signal onto terminal 49.

If there is a next switch turn on time value in the sequence (step 107), then the timer is loaded with the next switch turn on time value. When the timer expires, the microcontroller turns the first switch Q1 on by asserting a digital logic high signal onto terminal 49. If, on the other hand, there is no next switch turn on time value in the sequence (step 107), then the capacitor pre-charging mode operation is finished and the microcontroller begins controlling the AC-to-DC converter circuit to operate in a PFC mode (step 109). In the present example, the next switch turn on time value is the first value of the identified sequence so processing proceeds from step 107 to step 108. The first switch turn on time value is loaded into the timer, and the timer is started. When the timer expires, then microcontroller outputs a digital logic high signal on terminal 49 thereby turning the first switch Q1 15 on. The first switch turn on time value is such that the first switch is turned on at a time when the difference between the rectified voltage $V_R$ on node 58 and the storage capacitor voltage $V_C$ is a predetermined value $V_P$. The magnitude $V_P$ of this voltage difference determines the voltage across the inductor 12 when the first switch Q1 15 is turned on. The inductor 12 limits current flow through the inductor in accordance with the inductor equation: $i=(1/L)\int Vdt$. The current in the inductor 12 rises rapidly at a rate given by the voltage $V_P$ across the inductor. The voltage $V_R$, however, decreases. This decrease in $V_R$ causes the charging of the inductor 12 with energy to stop. When the charging of energy into the inductor stops, the inductor current has reached a peak current value. The peak current value is determined by the voltage $V_P$ across the inductor 12 when the first switch Q1 15 is turn on. With the charging of the inductor with energy having been stopped, the current in the inductor 12 begins to drop as energy from the inductor 12 is transferred into the storage capacitor 14. As a result, one pulse of charging current is pulsed into the storage capacitor 14. The pulse of charging current is colloquially said to pass from the bridge rectifier at node 58, through the inductor 12, through the diode 13, through the storage capacitor 14, through the switch 15, and back to the bridge rectifier at node 59. The diode 13 prevents current from flowing back in the opposite direction from the capacitor 14 and into the inductor 12. The diode 13 is not, however, needed for this function because the remainder of the circuit also serves to prevent current flow back from the capacitor 14 and into the inductor 12. The pulse of charging current causes the voltage $V_C$ on the capacitor to step up by a predetermined voltage amount. At this point, when the pulse of charging current stops flowing, the first switch Q1 15 is still on.

The microcontroller waits (step 105) for the next zero crossing. When the next zero crossing occurs, the microcontroller again controls the first switch Q1 15 to be off (step 106). If there is a next switch turn on time value in the sequence, then processing proceeds to step 108. In the presently described example, there is a next switch turn on time value. This is the second switch turn on time value of the sequence. The microcontroller loads the second switch turn on time value into the timer, and starts the timer. When the timer expires, the microcontroller causes the first switch Q1 15 to turn on by asserting a digital high logic onto terminal 49. As was the case with the first time the first switch Q1 15 was turned on, the first switch Q1 15 is turned on at a time when the difference between the rectified voltage $V_R$ on node 58 and the voltage $V_C$ on the storage capacitor is the predetermined value VP. The capacitor voltage $V_C$ is stepped up from the value it had at the time when the first switch was turned on the first time, so the first switch Q1 15 is made to turn on earlier in the AC sine wave so that the voltage $V_R$ will be correspondingly higher when the first switch Q1 15 turns on the second time. As was the case with the first pulse of charging current, the turning on of the first switch Q1 15 causes current to rise in the inductor 12, and the peak of this current is set by the magnitude $V_P$ of the voltage difference between $V_R$ and $V_C$ when the first switch Q1 15 is turned on. Because the voltage $V_P$ is the same for the second pulse as it was for the first pulse, the peak current magnitude of the second pulse is the same as the peak current magnitude of the first pulse. The voltage $V_R$ then decreases, and this stops the charging of the inductor with energy. The current in the inductor then drops as energy from the inductor is transferred into the storage capacitor. As a result, a second pulse of charging current is pulsed into the storage capacitor. Diode 13 prevents current flow back in the opposite direction from the storage capacitor 14 and into the inductor 12. The second pulse of charging current causes the voltage $V_C$ on the storage capacitor 14 to step up a second time. At this point, when the second pulse of charging current stops flowing, the first switch Q1 15 is still on. The microcontroller waits (step 105) for the next zero crossing. This using of each successive switch turn on time value of the identified sequence to cause a next pulse of charging current to charge the storage capacitor is repeated through steps 108, 105, and 106 and 107 until there is no next switch turn on time value in the sequence. At this point (step 107), the capacitor pre-charge operation is terminated and processing proceeds to step 109.

Advantageously, once the microcontroller 38 has started causing charging pulses to occur, the microcontroller 38 does not measure $V_C$ and use information from that measurement to determine when to turn switch Q1 15 on the next time. Rather, the switch turn on time values are pre-calculated so that when the first switch Q1 15 is turned on each time, the same $V_P$ should be present across the inductor, and the resulting pulse of charging current should have the same predetermined peak current as do the other pulses of charging current. The number of switch turn on time values and the switch turn on time values themselves are precalculated so that the storage capacitor will be charged in desired voltage steps, each step being of a desired voltage magnitude, from an initial storage capacitor voltage of approximately zero volts up to a final pre-charge storage capacitor voltage of $V_R$ peak. In the present example, the initial storage capacitor voltage is approximately zero volts, and the final pre-charge storage capacitor voltage is approximately +157 volts, and the first switch Q1 15 is turned on a total of seven times, and there are seven storage capacitor voltage steps. In another advantageous aspect, if when the storage capacitor is to be charged the initial capacitor voltage is not as assumed in the precalculation but rather there is an initial voltage already on the storage capacitor, then the storage capacitor will nevertheless not be overcharged. Even though the microcontroller does not check the voltage $V_C$, the storage capacitor will not become overcharged because unneeded initial pulses of the sequence will not occur. If $V_R$ at the time the first switch Q1 15 is turned on is by mistake not higher than $V_C$ as assumed in the precalculation, then the turning on of the first switch Q1 15 will not result in a pulse of charging current. In this way, one or more of the initial charging pulses may not occur, depending on how much initial charge the storage capacitor had, and the appropriate number of following pulses of charging current will occur to charge the storage capacitor up to the desired final pre-charge storage capacitor voltage.

A relatively less powerful and relatively less expensive microcontroller can be used in the circuit of FIG. 1 as compared to a prior art time-delayed switching inrush current control circuit where the microcontroller is called on to calculate the next switch turn on time, and to calculate this next switch turn on time starting after the prior calculation of the prior switch turn on time. No fast ADC converter is required to measure the capacitor voltage in good time so that there is enough time remaining after the digitization for the microcontroller to perform other calculations before the result of the calculations is required to turn on the switch the next time. The microcontroller 38 of FIG. 1 need not perform any such fast ADC conversions or fast calculations. Once the microcontroller 38 has identified the proper sequence, the microcontroller 38 only needs to turn off the first switch at zero-crossings and to turn on the switch at the times determined by the switch turn on time values of the sequence.

Figure 3:
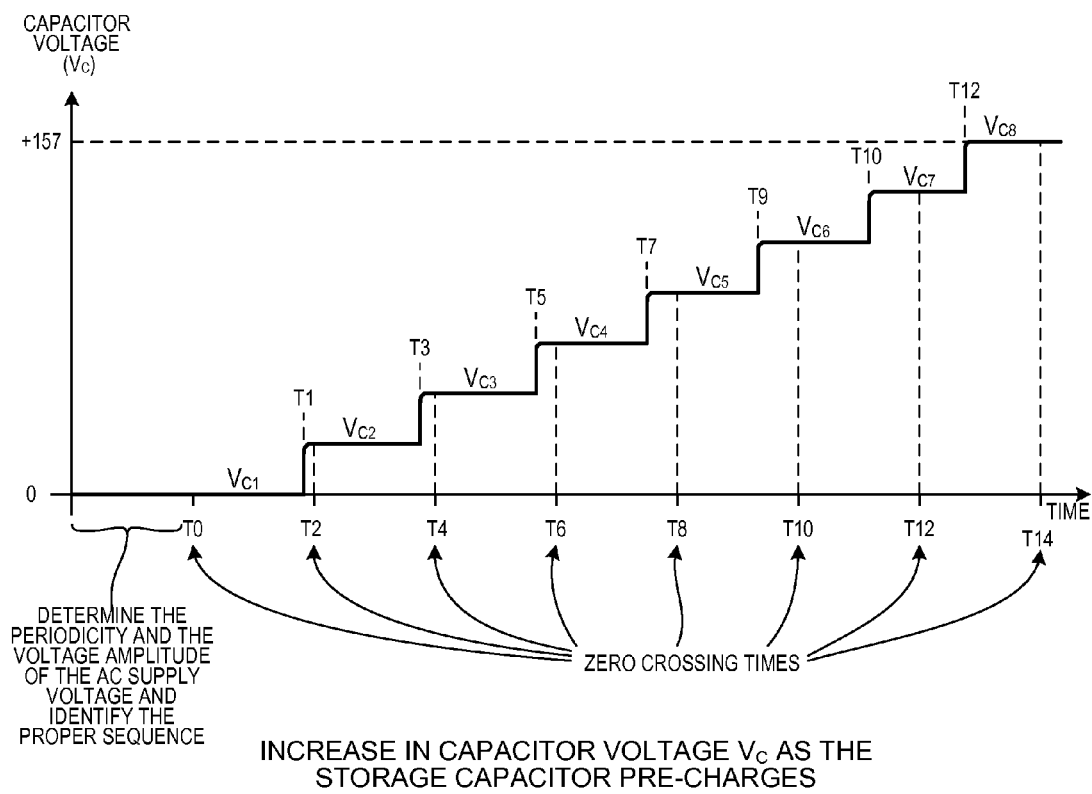
FIG. 3 is a diagram that illustrates how the storage capacitor voltage $V_C$ increases during the capacitor pre-charge operation of FIG. 2.

FIG. 3 is a diagram that illustrates a pre-charging operation carried out by the AC-to-DC converter circuit 2 of FIG. 1. During the time before time T0, the microcontroller determined the periodicity of the AC supply voltage and determined the voltage amplitude of the AC supply voltage. The microcontroller identified the proper sequence based on the determined periodicity and the determined voltage amplitude. Times T0, T2, T4, T6, T8, T10, T12 and T14 indicate zero crossing times. Starting at zero crossing time T0, the microcontroller times the time until it causes the first switch Q1 15 to turn on the first time at time T1. This time from T0 to T1 is determined by the first switch turn on time value of the sequence. A first pulse of charging current occurs starting at time T1, and as a result the voltage $V_C$ on the capacitor steps up at time T1. The first switch Q1 15 remains on from time T1 until the next zero crossing time at time T2. In this way, the voltage on the storage capacitor steps up seven times, as illustrated in FIG. 3.

Figure 4:
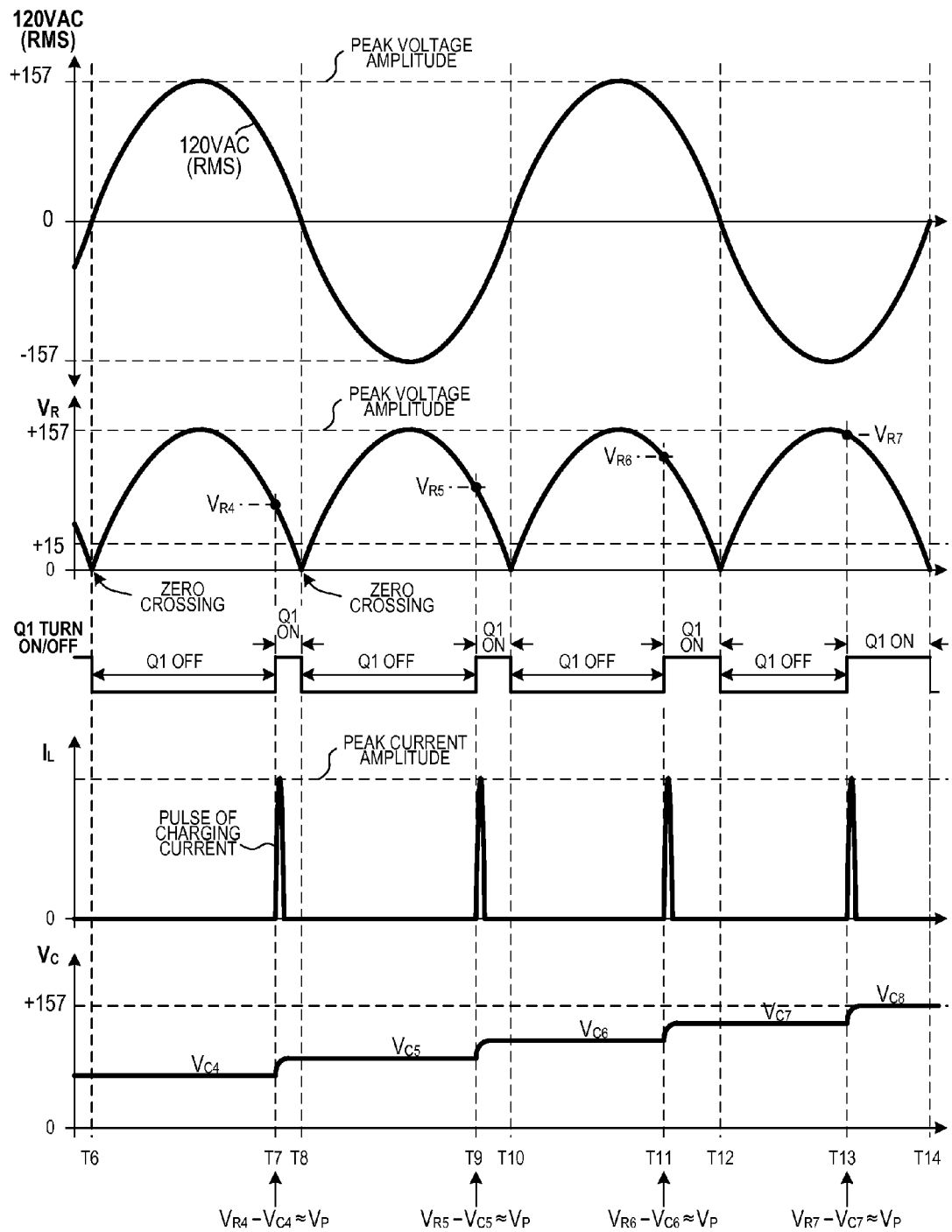
FIG. 4 is a set of more detailed waveform diagrams that illustrate voltages and currents in the AC-to-DC converter circuit of FIG. 1 during a portion of the time period illustrated in FIG. 3 between time T6 and time T14.

FIG. 4 is a set of more detailed waveform diagrams that illustrate voltages and currents during a portion of the time illustrated in FIG. 3 between time T6 and time T14. The upper waveform illustrates the VACIN input AC supply voltage. In this example, VACIN is a sinusoidal 120 volt AC RMS 60 hertz supply voltage. The second waveform down in the figure is a waveform of the rectified voltage signal $V_R$ on node 58. The third waveform down in the figure is a waveform of the digital switch control signal that is output onto terminal 49 of the microcontroller. When this digital signal has a digital high value then the first switch Q1 15 is controlled to be on, whereas when this digital signal has a digital low value then the first switch Q1 15 is controlled to be off. The fourth waveform down in the figure is a waveform of the current in the inductor 12. Four pulses of charging current are illustrated. The bottom waveform in the figure is a waveform of the storage capacitor voltage $V_C$. Note that the switch turn on time values are such that the voltage differences between $V_R$ and $V_C$ when the first switch Q1 15 is turned on at times T7, T9, T11 and T13 are all identical. Consequently the peak current amplitudes of the four corresponding pulses of charging current are all identical as well.

After the capacitor pre-charge mode operation has been completed, the microcontroller controls the second switch Q2 16 in the PFC mode (step 109). The microcontroller monitors the storage capacitor voltage VC via the resistor voltage divider involving resistors 24 and 25. The voltage on the tap 62 of this resistor voltage divider is supplied onto ADC input terminal 54 of the microcontroller and through terminal 54 the microcontroller monitors the voltage $V_C$ on the storage capacitor. The microcontroller causes the second switch Q2 16 pulse width modulate the ON/OFF times of switch Q2 16 so as to shape the envelope of the inductor current $I_L$ to have the same phase as the phase of the VACIN AC supply voltage, and to control the amplitude of the shaped $I_L$ current waveform such that the output voltage VDCOUT on terminal 5 does not go up or down out of tolerance with changes in load across the output terminals 5 and 6. Even though the microcontroller has the capacity to measure the voltage $V_C$ on the storage capacitor in this way, the microcontroller does not measure $V_C$ and use information from that measurement to determine when to turn on the first switch Q1 15 at any time between: 1) the time of the first pulse of charging current in the capacitor pre-charge mode operation, and 2) the time of the last pulse of charging current in the capacitor pre-charge mode operation. The microcontroller also does not need to, and does not, store program code of any program for on-the-fly calculations of switch turn on times based on storage capacitor voltage measurements made during the pre-charging operation.

FIG. 3 and FIG. 4 set forth an example of a capacitor pre-charge operation that has a relatively few number of pulses of charging current and that is therefore relatively easy to illustrate in patent diagrams. In a typical capacitor pre-charge operation, however, there are more pulses of charging current. In one typical case, there are sixteen pulses of charging current and sixteen voltage steps in the $V_C$ voltage. The inductor 12 has an inductance of 100 microhenries, and the storage capacitor has a capacitance of 720 microfarads. VDCOUT ripples not more than fifteen percent while the AC-to-DC converter circuit is outputting a 3.0 ampere steady state load current. The VACIN voltage range is from 80 volts RMS to 240 volts RMS. The VACIN periodicity can be detected to be one of the following: 50 hertz, 60 hertz and 400 hertz.

Although the present invention has been described in connection with certain specific embodiments for instructional purposes, the present invention is not limited thereto. The AC-to-DC converter circuit and pre-charge method is flexible and allows some sequences to control the first switch Q1 such that various ones of the pulses of charging current are of different predetermined peak current magnitudes. As described above, if the switch Q1 is turned on earlier (given the same storage capacitor voltage), then the peak current magnitude of the resulting pulse will be greater. This fact may be used to generate sequences of values that cause charging current pulses of different magnitude to charge a storage capacitor. Moreover, some sequences may result in the controlling the first switch Q1 such that in certain half cycles of the AC supply voltage there is no pulse of charging current generated. The plurality of sequences of values 60 need not be stored in the microcontroller 38, but rather may be stored elsewhere in other embodiments. The use of a sequence of pre-calculated values for controlling when the switch is turned on to generate current charging pulses is not limited to use in AC-to-DC converters, and is not limited to use with PFC circuitry such as that shown in FIG. 1. The pre-charging operation works and can be carried out in the circuit of FIG. 1 without the PFC control components 13 and 16 being present. Rather than storing many different sequences for many different AC supply voltage amplitudes, the microcontroller may determine the voltage amplitude and then adjust or scale the values of a sequence in order to generate a sequence of switch turn on time values appropriate for the determined voltage amplitude. Accordingly, various modifications, adaptations, and combinations of various features of the described embodiments can be practiced without departing from the scope of the invention as set forth in the claims.

What is claimed is:

1. A method, comprising:
(a) starting a capacitor pre-charge operation, wherein the pre-charge operation involves charging a storage capacitor of an AC-to-DC converter with multiple pulses of charging current so that the capacitor voltage increases in multiple charging steps from an initial storage capacitor voltage of approximately zero volts up to a final pre-charge storage capacitor voltage that is approximately equal to a peak voltage amplitude of a sinusoidal AC supply voltage;
(b) determining a periodicity of the AC supply voltage;
(c) identifying one sequence of a plurality of stored sequences and obtaining a sequence of switch turn on time values, wherein each stored sequence of the plurality of stored sequences is a sequence of switch turn on time values, wherein the obtained sequence of switch turn on time values is determined based at least in part on the determined periodicity;
(d) waiting for a next zero crossing of the AC supply voltage;
(e) if there is a next switch turn on time in the identified sequence then turning the switch on in accordance with the next switch turn on time value in the identified sequence and returning to (d) otherwise if there is not a next switch turn on time in the identified sequence then terminating the capacitor pre-charge operation, wherein the sequence identified in (c) is identified by a microcontroller, wherein a turning on of the switch in accordance with a switch turn on time value causes a pulse of charging current to flow in a current path provided that a rectified voltage output by a full bridge rectifier is adequately larger than the voltage on the storage capacitor when the switch is turned on, wherein the current path extends from the full bridge rectifier, then through an inductor, then through the storage capacitor, then through the switch, and then back to the full bridge rectifier, and wherein the microcontroller does not measure the voltage on the storage capacitor and use information from that measurement to determine when to turn the switch on at any time between: 1) the turning on of the switch a first time in accordance with a first switch turn on time in the identified sequence, and 2) the turning on of the switch a last time in accordance with a last switch turn on time in the identified sequence; and
(f) after the terminating of the capacitor pre-charge operation then detecting the storage capacitor voltage on the storage capacitor and using the detected storage capacitor voltage to control an output voltage of the AC-to-DC converter when the AC-to-DC converter is operating in a Power Factor Correction (PFC) mode, wherein (f) is performed by the microcontroller.

2. The method of claim 1, wherein (b) further involves determining the peak voltage amplitude of the AC supply voltage, and wherein the one sequence identified in (c) is determined also based at least in part on the determined peak voltage amplitude.

3. The method of claim 1, wherein one of the stored sequences is identified in (c) if the AC supply voltage has a sixty hertz period whereas another of the stored sequences if identified in (c) if the AC supply voltage has a fifty hertz period.

4. The method of claim 1, wherein (c) involves identifying the stored sequence and then modifying values in the stored sequence thereby obtaining the sequence of switch turn on time values.

5. The method of claim 1, wherein the stored sequence identified in (c) is the obtained sequence of switch turn on time values.

6. The method of claim 1, wherein each of the multiple pulses of charging current has a peak current amplitude, and wherein the peak current amplitudes of all of the multiple pulses of charging current are all substantially the same.

7. The method of claim 1, wherein each of the multiple pulses of charging current has a peak current amplitude, and wherein at least one of the peak current amplitudes of the pulses of charging current is different from others of the peak current amplitudes.

8. The method of claim 1, wherein there is at most one pulse of charging current that flows for each time that the switch is turned on in the pre-charge operation.

9. The method of claim 1, wherein the current path extends from the full bridge rectifier, then through the inductor, then through a diode, then through the storage capacitor, then through the switch, and then back to the full bridge rectifier, wherein a second switch is coupled between an anode of the diode and a ground node of the AC-to-DC converter, and wherein the microcontroller in (f) controls the second switch so as to shape a current waveform of a current flowing through the inductor.

10. The method of claim 1, wherein the turning on and off of the switch in accordance with the stored sequence identified in (c) results in one pulse of charging current flowing into the storage capacitor in a first half cycle of the AC supply voltage and results in no pulse of charging current flowing into the storage capacitor in a second half cycle of the AC supply voltage and results in one pulse of charging current flowing into the storage capacitor in a third half cycle of the AC supply voltage, wherein the second half cycle occurs after the first half cycle, wherein the third half cycle occurs after the second half cycle, and wherein the first, second and third half cycles all occur during the capacitor pre-charge operation.

11. An AC-to-DC converter circuit comprising:
a full bridge rectifier having a first AC input terminal, a second AC input terminal, a first output terminal, and a second output terminal;
an inductor;
a storage capacitor;
a switch; and
a microcontroller that controls the switch in a capacitor pre-charge mode of operation of the AC-to-DC converter circuit, wherein the microcontroller identifies a sequence of switch turn on time values and uses the turn on time values to turn on and off the switch such that a sequence of pulses of charging current flows in a current path through the storage capacitor and charges the storage capacitor in multiple charging steps, wherein there is at most one pulse of charging current that flows for each time that the switch is turned on in the pre-charge operation, wherein the current path extends from the first output terminal of the full bridge rectifier, then through the inductor, then through the storage capacitor, then through the switch, and to the second output terminal of the full bridge rectifier, wherein each pulse of charging current of the sequence of pulses has the same approximate peak current magnitude, wherein the microcontroller is coupled to measure a voltage on the storage capacitor and measures the voltage in a Power Factor Correction (PFC) mode of operation of the AC-to-DC converter circuit but wherein the microcontroller does not measure the voltage on the storage capacitor and use information from that measurement in the pre-charge mode of operation to determine when to turn the switch on at any time between the time of the first pulse of charging current of the sequence and the time of the last pulse of charging current of the sequence.

12. The AC-to-DC converter circuit of claim 11, wherein the microcontroller stores a plurality of stored sequences of switch turn on time values, and wherein the sequence of switch turn on time values that is identified by the microcontroller is one of the plurality of stored sequences.

13. The AC-to-DC converter circuit of claim 11, wherein the microcontroller determines a periodicity of an AC supply voltage, wherein the AC supply voltage is received by the AC-to-DC converter circuit onto the first and second AC input terminals of the full bridge rectifier, and wherein the microcontroller identifies a selected one of the plurality of stored sequences based at least in part on the determined periodicity.

14. The AC-to-DC converter circuit of claim 11, further comprising:
a diode, wherein the current path extends from the first output terminal of the full bridge rectifier, then through the inductor, then through the diode, then through the storage capacitor, then through the switch, and to the second output terminal of the full bridge rectifier; and
a second switch that is controlled by the microcontroller, wherein the second switch is coupled to conduct current between an anode of the diode and a ground node of the AC-to-DC converter circuit.

15. The AC-to-DC converter circuit of claim 14, wherein the microcontroller controls the second switch in the PFC mode of operation so as to shape a current waveform of a current flowing through the inductor.

16. An AC-to-DC converter circuit comprising:
a full bridge rectifier having a first AC input terminal, a second AC input terminal, a first output terminal, and a second output terminal;
an inductor;
a storage capacitor;
a switch; and
means for controlling the switch in a capacitor pre-charge mode of operation of the AC-to-DC converter circuit, wherein the means is also for identifying a sequence of switch turn on time values and for using the turn on time values to turn on and off the switch such that a sequence of pulses of charging current flows in a current path through the storage capacitor and charges the storage capacitor in multiple charging steps, wherein there is at most one pulse of charging current that flows for each time that the switch is turned on in the pre-charge operation, wherein the current path extends from the first output terminal of the full bridge rectifier, then through the inductor, then through the storage capacitor, then through the switch, and to the second output terminal of the full bridge rectifier, wherein the means is also for measuring a voltage on the storage capacitor during a Power Factor Correction (PFC) mode of operation of the AC-to-DC converter circuit but wherein the means does not measure the voltage on the storage capacitor and does not use information from that measurement in the pre-charge mode of operation to determine when to turn the switch on at any time between the time of the first pulse of charging current of the sequence and the time of the last pulse of charging current of the sequence.

17. The AC-to-DC converter of claim 16, wherein each pulse of charging current of the sequence of pulses has the same approximate peak current magnitude.

18. The AC-to-DC converter of claim 16, wherein some pulses of charging current of the sequence of pulses have different peak current magnitudes from other pulses of charging current of the sequence of pulses.

19. The AC-to-DC converter circuit of claim 16, wherein the means is also for storing a plurality of stored sequences of switch turn on time values, and wherein the sequence of switch turn on time values that is identified by the means is one of the plurality of stored sequences.

20. The AC-to-DC converter circuit of claim 16, wherein the means is also for determining a periodicity of an AC supply voltage received onto the first and second AC input terminals of the full bridge rectifier.

21. The AC-to-DC converter circuit of claim 16, wherein the means is also for determining a peak voltage amplitude of an AC supply voltage received onto the first and second AC input terminals of the full bridge rectifier.

22. The AC-to-DC converter circuit of claim 16, wherein the means is also for storing a plurality of stored sequences of switch turn on time values, and wherein the means is also for selecting one of the stored sequences based at least in part on a periodicity of an AC supply voltage received onto the first and second AC input terminals of the full bridge rectifier.

23. The AC-to-DC converter circuit of claim 16, wherein the means is also for storing a plurality of stored sequences of switch turn on time values, and wherein the means is also for selecting one of the stored sequences based at least in part on a peak voltage amplitude of an AC supply voltage received onto the first and second AC input terminals of the full bridge rectifier.

* * * * *